US008398356B2

(12) United States Patent
Sandoz

(10) Patent No.: US 8,398,356 B2

(45) Date of Patent: Mar. 19, 2013

(54) AUTOMOTIVE WHEELCHAIR MOBILITY SYSTEM

(75) Inventor: Edouard S. Sandoz, Powell, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/108,215

(22) Filed: May 16, 2011

(65) Prior Publication Data

US 2012/0294699 A1 Nov. 22, 2012

(51) Int. Cl.
*B60P 1/44* (2006.01)

(52) U.S. Cl. ........................................ 414/541; 414/921

(58) Field of Classification Search .................. 414/921, 414/541

See application file for complete search history.

(56) References Cited

U.S. PATENT DOCUMENTS

| | | | | | |
|---|---|---|---|---|---|
| 3,182,826 | A * | 5/1965 | Mutto | 414/541 |
| 3,516,559 | A * | 6/1970 | Walter | 414/541 |
| 3,847,292 | A * | 11/1974 | Williams et al. | 414/541 |
| 3,882,949 | A * | 5/1975 | Anderson | 180/8.2 |
| 4,075,719 | A | 2/1978 | Sullivan | |
| 4,096,955 | A | 6/1978 | Dake | |
| 4,133,437 | A * | 1/1979 | Gates | 414/541 |
| 4,170,368 | A * | 10/1979 | Southward et al. | 414/921 |
| 4,457,663 | A * | 7/1984 | Hems et al. | 414/522 |
| 4,483,653 | A | 11/1984 | Waite | |
| 4,493,602 | A * | 1/1985 | Koerber | 414/541 |
| 4,493,603 | A * | 1/1985 | Williams et al. | 414/541 |
| 4,555,121 | A * | 11/1985 | Lockard et al. | 280/30 |
| 4,664,584 | A * | 5/1987 | Braun et al. | 414/541 |
| 4,847,972 | A * | 7/1989 | Anderson et al. | 29/401.1 |
| 5,137,413 | A * | 8/1992 | Ressler | 414/474 |
| 5,308,214 | A * | 5/1994 | Crain et al. | 414/541 |
| 5,421,693 | A * | 6/1995 | Petersen | 414/678 |
| 5,542,811 | A * | 8/1996 | Vartanian | 414/541 |
| 5,890,869 | A * | 4/1999 | LeMaster et al. | 414/678 |
| 6,042,330 | A | 3/2000 | Egan | |
| 6,074,306 | A * | 6/2000 | Behringer | 472/43 |
| 6,416,272 | B1 | 7/2002 | Suehiro et al. | |
| 6,962,383 | B2 * | 11/2005 | Takenoshita et al. | 296/65.03 |
| 7,296,960 | B2 | 11/2007 | Strong | |
| 7,374,390 | B2 | 5/2008 | Strong | |

OTHER PUBLICATIONS http://www.daihatsu.com/brand/motorshow/tokyo05/mira-s/index.html (printed Jan. 15, 2010).
http://www.bruno.com/tas-models.html (printed Jan. 14, 2010).

* cited by examiner

*Primary Examiner* — James Keenan

(74) *Attorney, Agent, or Firm* — Fay Sharpe LLP

(57) ABSTRACT

A wheelchair lift and restraining device for an automotive vehicle includes a base pivotally mounted beneath the main floor of a vehicle. First and second support arm portions extend outwardly from the base and are configured for engagement with a wheelchair frame, preferably a wheel axle. A rotating assembly selectively moves the support arm through approximately 90° of rotation and the system is raised and lowered relative to the vehicle to transport the wheelchair from outside the vehicle to the interior of the vehicle, and also position the wheelchair at a desired height in the vehicle interior. Translation movement of the support arms also positions the wheelchair occupant at a desired location. A headrest extends from the system to provide desired neck and head support.

13 Claims, 5 Drawing Sheets

AUTOMOTIVE WHEELCHAIR MOBILITY SYSTEM

BACKGROUND

This disclosure generally relates to automotive vehicles, and more particularly to incorporating a wheelchair mobility system into an automotive vehicle.

Currently, individuals who use a wheelchair have a few basic ways to enter or exit an automotive vehicle, as well as ride in the vehicle while seated in the wheelchair. One typical mobility system uses a ramp that selectively extends from the vehicle floor to the ground surface external of the vehicle. This allows the wheelchair to roll along the ramp and overcome a height difference between the vehicle interior and the terrain outside the vehicle. Another common type of mobility system incorporates a lift mounted in the vehicle which raises and lowers a wheelchair from the ground surface to the vehicle floor height. Some lifts selectively rotate about a vertical axis and then are raised/lowered from vehicle interior, while others pivot about a horizontal axis (like a drawbridge) and then are raised/lowered from the vehicle interior.

Either the ramp or the lift extends from the vehicle a substantial distance. Further access area is desired in addition to this distance to allow easy maneuvering of the wheelchair on to the ramp/lift and thereby advantageously use the ramp or lift option. When deployed to load or unload a wheelchair passenger, present systems require up to approximately six (6) feet to allow the wheelchair to be loaded from the side or rear of the vehicle. With the ramp, the angle for ingress ranges from approximately 8 to 12 degrees which can be very difficult for manual wheelchair users. If a lift is used, the user still needs to push the wheelchair on to a platform before being raised or lowered.

Once the wheelchair user is located inside the vehicle, a second device is typically required to hold the wheelchair securely in place while the vehicle is driven. Various mounting systems, tie-downs, clamp arrangements, etc. are available for securing or locking the wheelchair in the vehicle. Additional hardware or brackets are required to mount the securing or lock mechanism to the automotive vehicle, typically securing the securing mechanism to the vehicle floor. In many instances, some modification is additionally required to the wheelchair to allow the wheelchair to interface with the securing mechanism. At a minimum, at least a portion of the vehicle interior is modified to accept the wheelchair securing mechanism. Likewise, in addition to the lock mechanism, an anti-tip bracket is oftentimes mounted to the floor to help hold the wheelchair from pivoting or rotating around a main lock post.

As a result, mass produced vehicles must be significantly modified to accommodate the enlarged ramp or lift platform. For example, the entire floor must be lowered to accommodate wheelchair ingress/egress, as well as wheelchair mounting within the vehicle. Lowering the entire floor of the vehicle compromises the rear passenger foot area. The wheelchair lift/ramp also has a corresponding large impact on the vehicle structure and cost, in addition to requiring an additional securing mechanism to hold the wheelchair in place during vehicle operation.

Thus, as is evident from known systems, potential drawbacks are present with these existing systems and may include multiple components for system installation, extensive modification to the automotive vehicle, possible modification of the wheelchair, added expense, and additional weight. Moreover, the amount of room needed within the automotive vehicle for these components correlates to reduced space for other passengers or cargo. Still another drawback associated with these types of systems is that current mobility systems or securing mechanisms do not provide head or neck support for individuals travelling in wheelchairs.

Consequently, a significant need exists for an improved automotive wheelchair mobility system that overcomes one or more of these perceived deficiencies in existing systems.

SUMMARY

A wheelchair lift and restraining device for an automotive vehicle includes a base pivotally mounted to the vehicle. A support arm extends substantially horizontally outwardly from the base and the support arm is configured for engagement with an associated wheelchair. A rotating assembly selectively moves the support arm through at least 90° of rotation relative to the vehicle so that the associated wheelchair is moved from a position outside of the vehicle to a position inside the vehicle.

A head rest extends from the support arm to provide head or neck support for an individual travelling in the wheelchair in the vehicle.

An engagement member extends from the base and is configured for operative supporting engagement with a back portion of the associated wheelchair. In one preferred arrangement, the engagement member includes first and second support hooks having generally U-shaped recesses configured to receive a back frame portion of the associated wheel chair.

The support arm is movably mounted to the base for selective, generally horizontal fore and aft movement toward and away from the base.

A switch limits fore and aft movement of the support arm relative to the base.

Preferably, the support arm is configured to engage the frame, and more preferably configured to engage an axle portion of the associated wheelchair, typically including first and second arm portions disposed in substantially parallel relation, for engaging spaced locations along the axle portion of the associated wheelchair.

The head rest preferably rotates and lifts with the support arm, and likewise moves with the device in generally horizontal fore and aft movement toward and away from the base.

A switch assembly limits at least one of fore and aft movement of the device.

A primary benefit of the device is the ability to combine a solution for entering and exiting the vehicle, as well as holding the wheelchair in place once the wheelchair is received in the vehicle.

Another benefit is that the present wheelchair mobility system is much smaller than known systems.

Still another advantage resides in the compact design which results in less modifications being required to adapt a vehicle for wheelchair access.

A further benefit is that the new system has less impact on space required for other passengers.

Still another benefit is that the system lifts the wheelchair frame and does not support the wheelchair under the wheels thereby reducing size and weight compared to other lift systems.

Still another benefit is that the new system extends only a short distance outwardly from the vehicle in order to attach to the wheelchair frame, thereby greatly reducing the space for the user to enter or exit the vehicle.

Because the lift attaches to the wheelchair frame, there is no need for a user to push up a ramp or up onto a platform, and instead the user is able to back up to the vehicle while at ground level.

There is no additional hardware or brackets required to be added to the user's wheelchair.

Still another benefit resides in the increased comfort to the head and added neck support in the new device.

Still other benefits and advantages of the present disclosure will become apparent upon reading and understanding the following detailed description.

DETAILED DESCRIPTION

Figure 1:
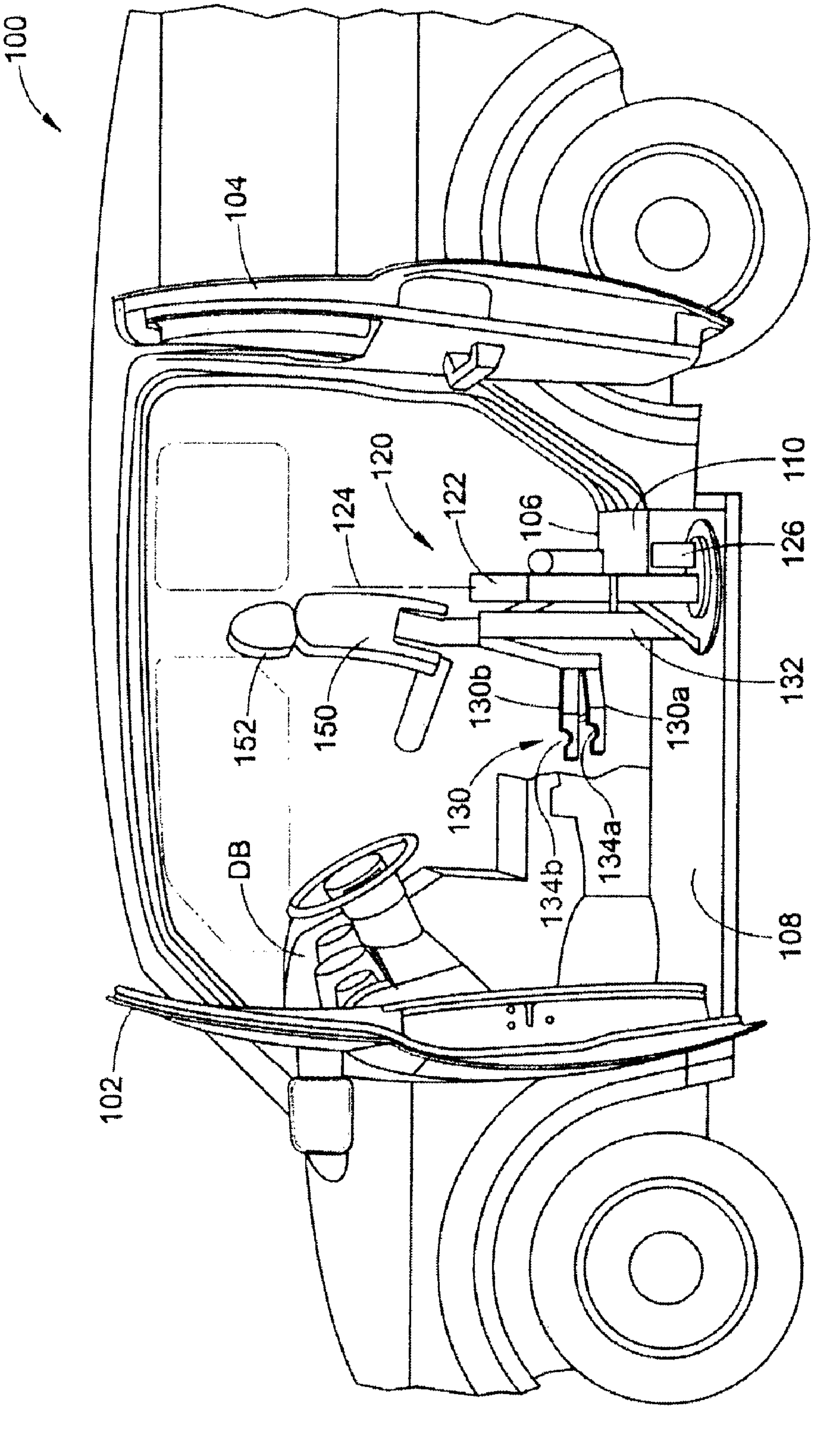
FIG. 1 is a side view of an automotive vehicle with the side doors open to illustrate the new automotive wheelchair mobility system.
Figure 2:
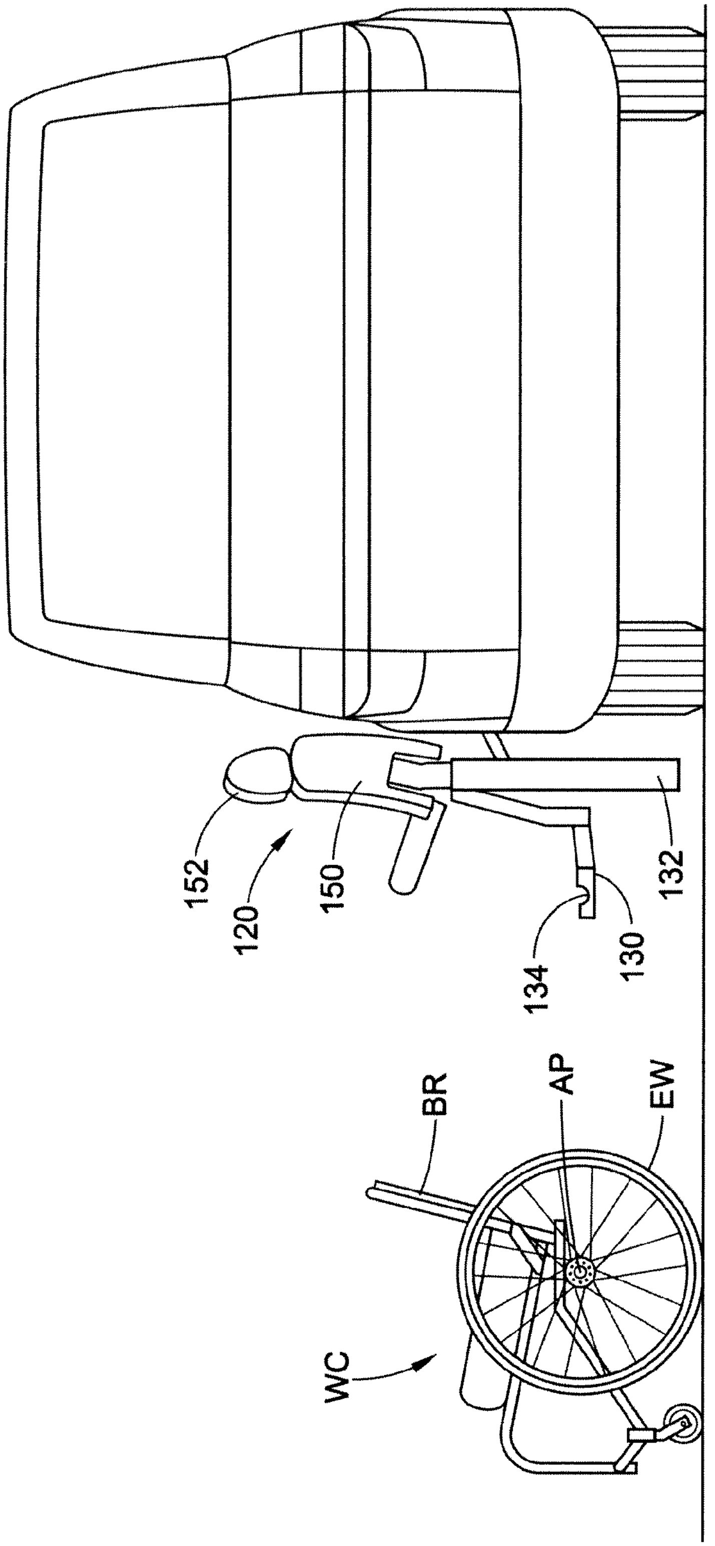
FIG. 2 is a view showing the lift rotated approximately 90° from the position shown in FIG. 1 and lowered relative to the vehicle in a position ready to accept a wheelchair.
Figure 3:
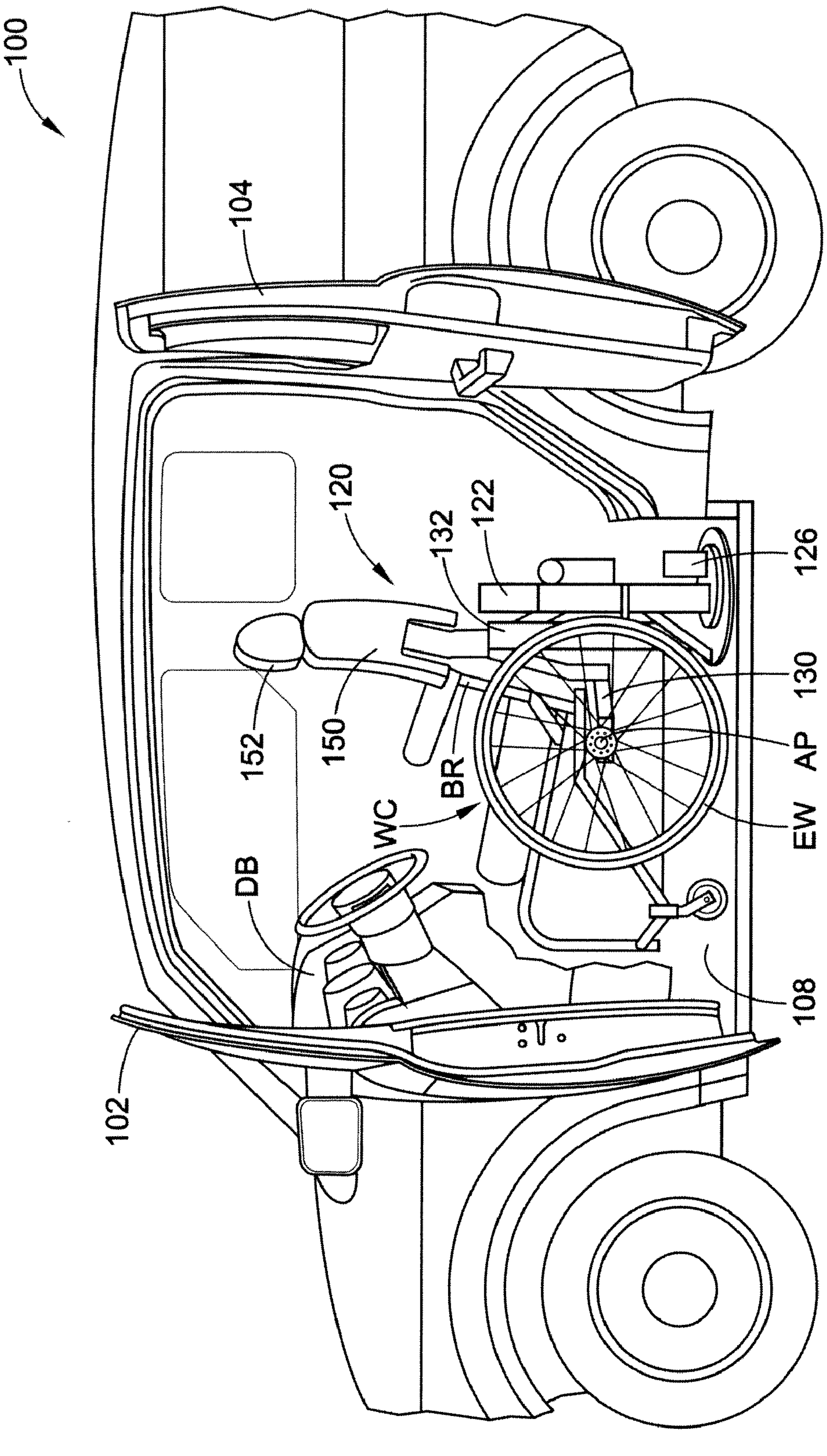
FIG. 3 is a side view of the vehicle with the wheelchair mounted in the vehicle.
Figure 4:
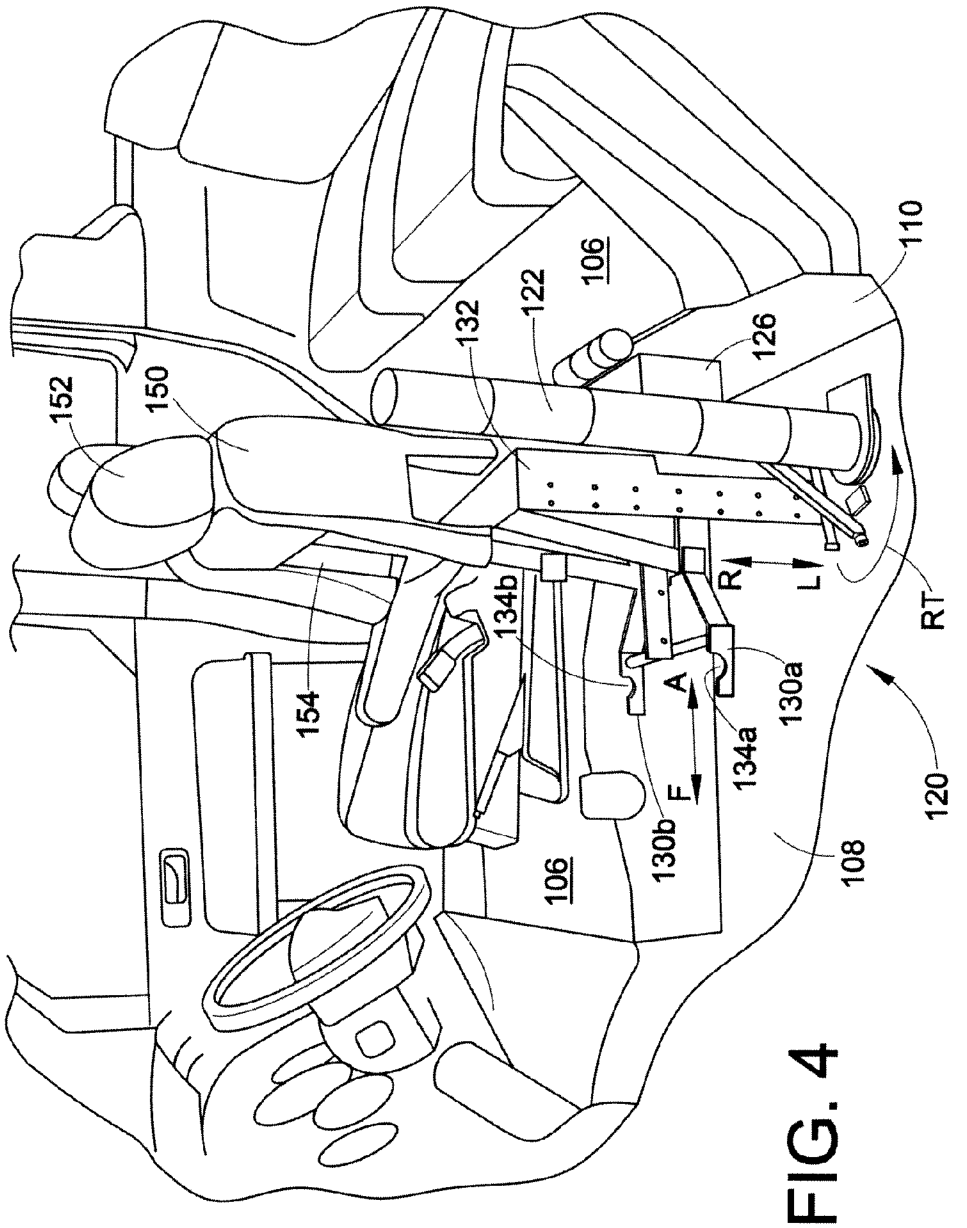
FIG. 4 is an enlarged view of the lift in the vehicle without the wheelchair and illustrating the various movements of the system.

Turning to FIGS. 1-5, there is shown an automotive vehicle 100 which in this instance is a Honda Element, although other vehicles can incorporate concepts of the present disclosure without departing from the scope and intent of the present disclosure. Front door 102 and rear door 104 are shown in an open condition along one side of the vehicle 100 (FIGS. 1 and 3). Here, the driver's side of the vehicle is illustrated although it will be appreciated that the system to be described below is equally applicable to the passenger side of the vehicle also. A portion of floor 106 is lowered by a predetermined height to provide a lower floor surface 108 that is interconnected to the standard floor 106 along wall 110 (FIGS. 1, 3, and 4). As shown, the intrusion on the remainder of the floor 106 of the automotive vehicle is limited. That is, the floor 106 is maintained along the passenger side and along the rear seat of the vehicle 100 in this particular embodiment.

An automotive wheelchair mobility system 120 is provided and the system or device 120 is preferably mounted to the lower floor surface 108, preferably along a rearward portion of the floor surface 108 as will become more apparent below. The system 120 includes a base or upright frame 122 which is mounted to the lower floor surface 108 in a generally upright position. The base 122 extends upwardly from the floor and is adapted to selectively rotate at least a portion of the mobility system about vertical axis 124. Also secured to the base is a drive mechanism or motor, such as electric motor 126, for providing desired power to rotate, lift, extend, move, adjust etc. selected portions of the mobility system relative to other portions of the mobility system, or relative to the vehicle. Of course, alternative drive mechanisms could be used successfully although the electric drive motor is preferred because of the compact nature of the motor and ease of interconnecting the drive motor to the remainder of the electrical system of the vehicle. One skilled in the art will appreciate that the electric motor 126 may be powered by the main electrical system (battery/generator) of the vehicle, and/or may include an additional battery backup.

A support arm 130, and more particularly a pair of support arm portions 130*a*, 130*b* extend outwardly from a frame portion 132 in generally horizontal, parallel relation. These support arm portions 130*a*, 130*b* each include a recess 134*a*, 134*b* shown here as a curved or arcuate recess, that is configured or contoured for engagement with a portion of the wheelchair frame, and preferably configured for receipt around a perimeter portion of corresponding axle portions AP of the associated enlarged wheels EW of the wheelchair WC (FIGS. 2-3). The support arms 130 extend outwardly from the base 122 approximately one to two feet, i.e., a limited distance, in a substantially horizontal direction (or generally perpendicular from the upright base) so that when the frame is rotated about the vertical axis 124, the support arms extend outwardly in a generally perpendicular direction from the side of the vehicle a limited distance on the order of one to two feet. In addition, the support arms 130 maintain a generally horizontal position, although they do rotate about the vertical axis 124, and are moved upwardly and downwardly relative to the vehicle 100 during the lift operation, and also move fore and aft as will be described in greater detail below.

Angling upwardly from first or rear ends of the support arm 130 are respective support hooks 136, also referred to as hook portions 136*a*, 136*b* (perhaps best illustrated in FIG. 5), that each include a corresponding generally J-shaped recess 138*a*, 138*b* that engage the back rest BR (frame portion) of the wheelchair WC and keep the wheelchair from rotating forwardly when the wheelchair is lifted during powered operation of the mobility system 120. As will be appreciated, when received by the mobility system 120, the wheelchair WC is supported by the support arm portions 130*a*, 130*b* along the wheel axle portions AP, and also along the backrest BR of the wheelchair by the hook portions 136*a*, 136*b*. In addition, an upper portion 150 of the seatback and preferably a headrest 152 are secured to the frame for receipt over the upper end of the backrest BR of the wheelchair WC. A cutout 154 (FIGS. 4-5) is preferably provided in the upper portion 150 of the seat and dimensioned to receive the backrest BR of the wheelchair WC while still situating the seat upper portion and the headrest 152 in a desired location for the wheelchair occupant.

Figure 5:
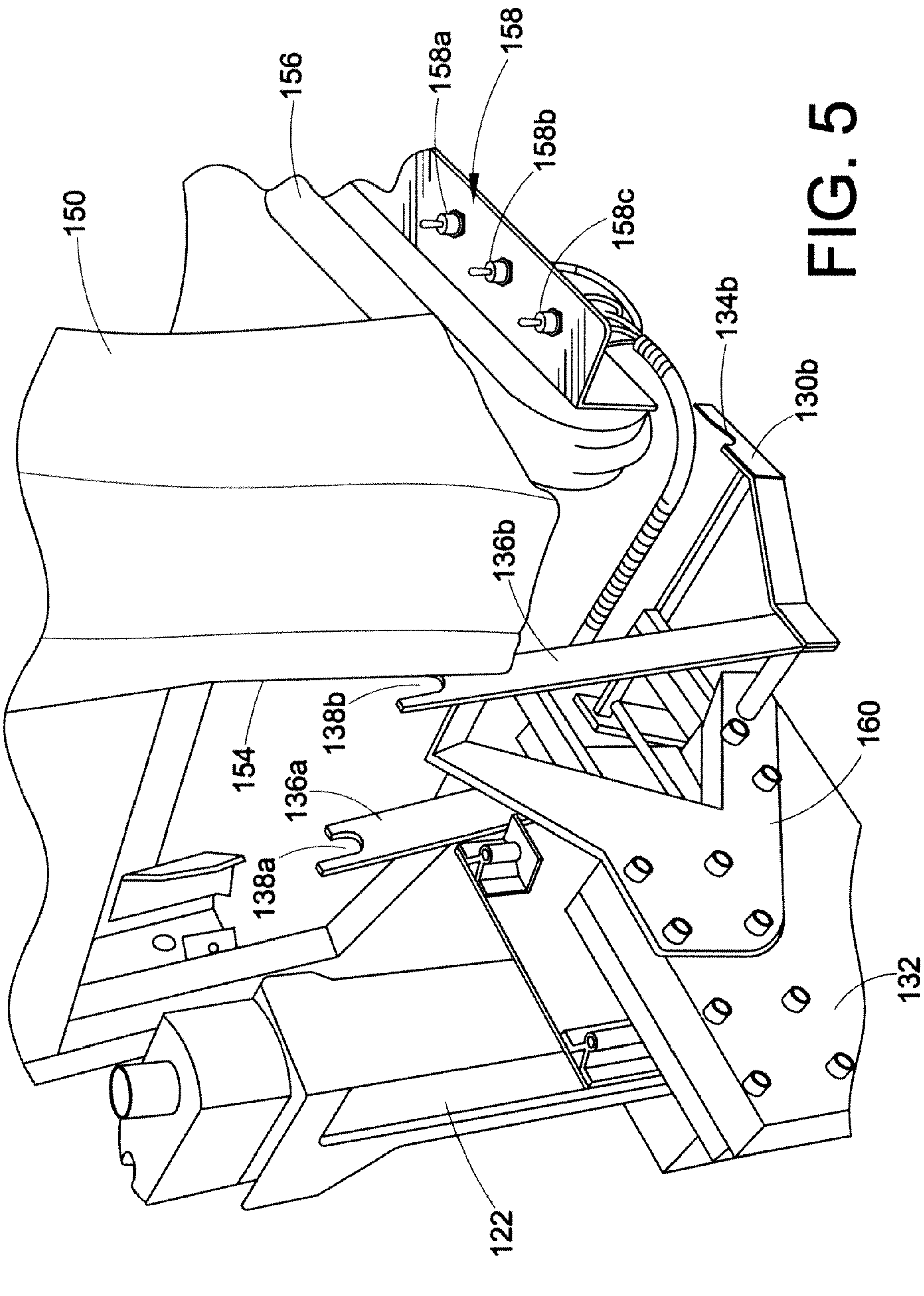
FIG. 5 is a rear perspective view of the lift and particularly illustrating the back rest assembly.

One arm rest 156 is shown extending outwardly from the upper portion 150 of the system. Preferably controls 158 are secured to the arm rest 156 so that the wheelchair occupant can control selective raising/lift R and lowering/descent L of the device, and likewise the wheelchair WC mounted thereon, as well as rotation RT about the vertical axis 124, and translational movement fore F and aft A along slider 160 (see reference arrows in FIG. 4 depicting the various types of movement). As best shown in FIG. 5, the controls include three separate toggle switches, 158*a*, 158*b*, 158*c* for independently providing control for these modes of operation of the mobility system 120. One skilled in the art will also appreciate that three independent switches are not required, and that the same operation or functionality could be achieved in other ways such as a series of limit switches, or limit switches used in conjunction with an electronic control unit (ECU), or still other arrangements.

From the position shown in FIG. 1, a portion of the frame 132 including at least the support arms 130 are first rotated about vertical axis 124 outwardly from the vehicle 100 through approximately 90° from a first position pointing toward the dashboard DB of the vehicle, to a second position where the support arms extend outwardly from the side of the vehicle when the doors 102, 104 are opened (FIG. 2). It will also be appreciated that a suitable interlock switch could be provided so that the mobility system 120 is incapable of operation until the doors are opened. Once the support arms 130 have been rotated 90° outward, the wheelchair occupant rolls the back of the wheelchair WC over the support arms into a position where the hook portions 136*a*, 136*b*, and particularly the recesses 138*a*, 138*b* thereof, are received or engage the backrest BR of the wheelchair. This also advantageously aligns the recesses 134 of the support arms 130 beneath the axle portion AP of the wheels EW of the wheelchair. Next, the support arms are raised by operating the lift toggle in order to raise the wheelchair generally vertically upwardly so that the rear, enlarged wheels of the wheelchair are slightly above the lower floor surface 108 of the vehicle. Next, the control for rotation of the mobility system wheelchair is actuated in order to rotate the support arms and supported wheelchair through approximately 90° and swing the wheelchair into the vehicle. Subsequently, fore F and aft A adjustment of the wheelchair relative to the vehicle may be accomplished through use of the third control switch or actuator.

It will also be appreciated that a switch can be incorporated into the wheelchair mobility system that limits forward and/or aft sliding movement of the wheelchair between first and second dimensional limits. This will allow the wheelchair user to be moved to a comfortable position, for example, relative to the steering wheel, dashboard, vehicle controls, etc.

Once the wheelchair occupant has adjusted the fore and aft position of the wheelchair WC relative to the vehicle 100, the mobility system is then slightly lowered so that the enlarged wheels EW of the wheelchair are brought into slight engagement with the lower floor surface 108. In this manner, the mobility system 120 is used not only for ingress and egress of the wheelchair WC relative to the vehicle, but the same system also restrains the wheelchair from further movement once it is adjusted to the desired location within the vehicle.

As particularly evident in FIGS. 1, 3, and 4, only a portion of the floor 106 needs to be modified in the automotive vehicle in order to customize and receive the wheelchair mobility system 120. Rear passengers can still obtain access to the rear seats by stepping around the wheelchair mobility system once the system is mounted to the lower floor surface. Further, the height of floor 106 for the rear passengers and the front passenger remains unaltered.

As perhaps best illustrated in FIG. 2, the wheelchair mobility system extends outwardly from the vehicle only a short distance and therefore minimizes the space needed adjacent the vehicle for the wheelchair user to enter and exit. No additional bracket is required to be mounted to the wheelchair in order to secure the wheelchair WC within the automotive vehicle. Instead, the support arms 130 and the support hooks 136 provide a secure engagement with the wheelchair, and preferably along the wheel axle WA and backrest BR portions of the wheelchair. Of course, alternative frame locations on the wheelchair could be used for supporting the wheelchair during the lift and restraining functions. For example, although the preferred embodiment employs recesses or hook shapes to engage the wheelchair axle and back rest other restraint devices could be used without departing from the scope and intent of the present disclosure. Other suitable interface structures could be used between the lift and wheelchair, and these structures may be changeable for different wheelchairs. For example, a bracket secured or bolted to the wheelchair frame that engages a universal locking device mounted to the vehicle could be used to securely hold a wheelchair in a vehicle, and it is contemplated that different types of brackets may be available for different types and styles of wheelchairs. Likewise, many different types or designs of brackets could be used to engage different wheelchair types or styles. The brackets would be securely fastened to the lift and operatively cooperate with the wheelchair with the expectation that if a user obtained a new wheelchair, the vehicle was sold, or the new owner had a different wheelchair, then a different type of device or bracket on the lift could be used to secure the wheelchair during the lift process, and subsequently within the vehicle. Additional comfort is provided for the wheelchair occupant's head and also for desired neck support by incorporating the upper portion of the seat 150 and the headrest 152, as well as the cutout 154 that accommodates the backrest of the wheelchair. Likewise, the controls 158 are advantageously and easily accessible to the wheelchair occupant.

The disclosure has been described with reference to the preferred embodiments. Modifications and alterations will occur to others upon reading and understanding the specification. It is intended to include all such modifications and alterations in so far as they come within the scope of the appended claims or the equivalents thereof.

It is now claimed:

1. A wheelchair lift and restraining device for an automotive vehicle, the device comprising:
- a base pivotally mounted beneath an associated main floor of the vehicle;
- a support arm extending substantially horizontally outwardly from the base and the support arm configured for engagement with an associated wheelchair;
- an engagement member extending from the base in spaced relation relative to the support arm and configured for operative supporting engagement with a back portion of the associated wheelchair, the support arm and the engagement member supporting the associated wheelchair without use of a platform;
- a rotating assembly for selectively moving the support arm and engagement member through at least approximately 90 degrees of rotation relative to the vehicle so that the associated wheelchair is moved from a position outside of the vehicle to a position inside the vehicle; and
- a headrest and an upper portion of a seat back each extending from the support arm, and the upper portion of the seat back including a cutout that is configured to receive the back portion of the associated wheelchair.

2. The device of claim 1 wherein the engagement member includes first and second support hooks having generally U-shaped recesses configured to receive a back frame portion of the associated wheelchair.

3. The device of claim 1 wherein the support arm is movably mounted to the base for selective, generally horizontal fore and aft movement toward and away from the base.

4. The device of claim 1 further comprising a switch for limiting fore and aft movement of the support arm relative to the base.

5. The device of claim 1 wherein the support arm includes first and second arm portions disposed in substantially parallel relation for operatively engaging spaced locations along an axle portion of the associated wheelchair.

6. The device of claim 1 wherein the headrest rotates and lifts with the support arm.

7. The device of claim 6 wherein the support arm is movably mounted to the base for selective, generally horizontal fore and aft movement toward and away from the base.

8. The device of claim 7 wherein the headrest moves fore and aft with the support arm.

9. A wheelchair lift and restraining device for an automotive vehicle, the device comprising:
- a base pivotally mounted beneath an associated main floor of the vehicle;

first and second support arm portions extending substantially horizontally outwardly from the base and each support arm portion including a recess adjacent an outer end thereof for engagement with an axle of an associated wheelchair, the support portions movably mounted to the base for selective, generally horizontal fore and after movement toward and away from the base;

an engagement member extending from the base in spaced relation relative to the support arm portions and configured for operative supporting engagement with a back portion of the associated wheelchair, the support arm portions and the engagement member supporting the associated wheelchair without use of a platform;

a rotating assembly for selectively moving the support arm and engagement member through at least approximately 90 degrees of rotation relative to the vehicle so that the associated wheelchair is moved from a position outside of the vehicle to a position inside the vehicle; and a headrest and an upper portion of a seat back each extending from the support arm, and the upper portion of the seat back including a cutout that is configured to receive the back portion of the associated wheelchair.

10. The device of claim 9 further comprising a switch for limiting fore and aft movement of the support arm relative to the base.

11. The device of claim 9 wherein the headrest rotates and lifts with the support arm.

12. The device of claim 9 wherein the engagement member includes first and second support hooks have generally U-shaped recesses configured to receive the frame back portion of the associated wheelchair.

13. The device of claim 12 wherein the generally U-shaped recesses are inclined relative to the vertical axis.

* * * * *